(12) United States Patent
Mercer

(10) Patent No.: US 9,215,343 B2
(45) Date of Patent: *Dec. 15, 2015

(54) ARRANGEMENT FOR READING FROM AND/OR WRITING TO FLEXIBLE SHEET MEDIA IN A CURVED CONFIGURATION AND METHOD

(71) Applicant: John E. Mercer, Gig Harbor, WA (US)

(72) Inventor: John E. Mercer, Gig Harbor, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/463,575

(22) Filed: Aug. 19, 2014

(65) Prior Publication Data

US 2014/0355081 A1  Dec. 4, 2014

Related U.S. Application Data

(63) Continuation of application No. 13/919,058, filed on Jun. 17, 2013, now Pat. No. 8,842,345, which is a continuation of application No. 13/467,839, filed on May 9, 2012, now Pat. No. 8,477,389, which is a (Continued)

(51) Int. Cl.
*H04N 1/04* (2006.01)
*H04N 1/06* (2006.01)
(Continued)

(52) U.S. Cl.
CPC ............... *H04N 1/06* (2013.01); *H04N 1/0057* (2013.01); *H04N 1/0062* (2013.01);
(Continued)

(58) Field of Classification Search
CPC ... H04N 1/0057; H04N 1/00618; H04N 1/06; H04N 1/0607; B65H 2220/01; B65H 2220/02; B65H 2511/416; B65H 2801/39; B65H 2801/06; B65H 2220/03; B65H 2220/11; B65H 2402/411; B65H 5/062

USPC ............ 358/498, 474, 493, 488; 399/130, 21, 399/28, 367, 388, 407, 92
See application file for complete search history.

(56) References Cited

U.S. PATENT DOCUMENTS 3,699,249 A  10/1972 Crane et al.
3,864,696 A * 2/1975 Fischbeck ...................... 347/38
(Continued)

FOREIGN PATENT DOCUMENTS

GB  2073986  10/1981

*Primary Examiner* — Negussie Worku
(74) *Attorney, Agent, or Firm* — Pritzkau Patent Group, LLC

(57) ABSTRACT

An assembly for transferring information to and/or from flexible sheet media in a highly advantageous curved configuration is disclosed. The sheet material includes a length and a width defining first and second opposing surfaces. The assembly includes support means for supporting the sheet the curved configuration across its width, having the first surface inwardly oriented with respect to the curved configuration. Thereafter, moving means moves the flexible sheet material so supported in a direction along a read/write path generally parallel to the sheet material length and transverse to the direction of curvature. A read/write arrangement is provided which is configured for reading and/or writing information across the width of the first surface of the sheet as the sheet is moved along the path in the curved configuration. In one feature, means is provided for rotationally moving the read/write arrangement in a predetermined way in the housing such that the read/write arrangement is in a confronting relationship with the first, inwardly oriented surface and cooperates with the movement provided by the sheet material moving means so as to cause the read/write arrangement to sequentially read information from and/or write information to the inwardly oriented, first surface of the sheet as the read/write arrangement traverses the width of the flexible sheet material while the latter is on the read/write path in the curved configuration. In another feature, a read and/or write operation may be performed on the second, outwardly oriented surface of the sheet material.

15 Claims, 6 Drawing Sheets

Related U.S. Application Data continuation of application No. 13/163,031, filed on Jun. 17, 2011, now Pat. No. 8,189,240, which is a continuation of application No. 12/758,993, filed on Apr. 13, 2010, now Pat. No. 7,973,982, which is a continuation of application No. 11/688,164, filed on Mar. 19, 2007, now Pat. No. 7,724,404, which is a continuation of application No. 10/753,308, filed on Jan. 8, 2004, now Pat. No. 7,212,319, which is a continuation of application No. 10/017,771, filed on Dec. 12, 2001, now Pat. No. 6,697,174, which is a continuation of application No. 09/165,668, filed on Oct. 3, 1998, now Pat. No. 6,344,904.

(51) Int. Cl.
    *H04N 1/00*     (2006.01)
    *H04N 1/08*     (2006.01)
    *H04N 1/203*     (2006.01)

(52) U.S. Cl.
    CPC ...... *H04N 1/00278* (2013.01); *H04N 1/00602* (2013.01); *H04N 1/00618* (2013.01); *H04N 1/0607* (2013.01); *H04N 1/0628* (2013.01); *H04N 1/0642* (2013.01); *H04N 1/0664* (2013.01); *H04N 1/08* (2013.01); *H04N 1/0821* (2013.01); *H04N 1/0856* (2013.01); *H04N 1/203* (2013.01); *H04N 1/2032* (2013.01); *H04N 1/0461* (2013.01)

(56) References Cited

U.S. PATENT DOCUMENTS

| | | |
|---|---|---|
| 4,103,171 A | 7/1978 | Schroeder |
| 4,479,148 A | 10/1984 | Sheck et al. |
| 4,517,538 A | 5/1985 | Bohg et al. |
| 4,517,638 A | 5/1985 | Provisor et al. |
| 4,793,812 A | 12/1988 | Sussman et al. |
| 4,921,363 A | 5/1990 | Nishihara et al. |
| 5,535,010 A * | 7/1996 | Izumi et al. .................. 358/296 |
| 5,579,115 A | 11/1996 | Stein et al. |
| 5,592,576 A * | 1/1997 | Hayashi ....................... 382/318 |
| 5,745,253 A | 4/1998 | Muramatsu et al. |
| 6,064,779 A | 5/2000 | Neukermans et al. |
| 6,330,083 B1 | 12/2001 | Nabeshima et al. |
| 6,344,904 B1 * | 2/2002 | Mercer ......................... 358/296 |
| 6,462,840 B1 | 10/2002 | Kravtsov |
| 6,628,446 B1 | 9/2003 | Shahar et al. |
| 6,697,174 B2 * | 2/2004 | Mercer ......................... 358/493 |
| 7,034,967 B2 | 4/2006 | Ochi et al. |
| 7,212,319 B2 * | 5/2007 | Mercer ......................... 358/474 |
| 7,268,923 B2 | 9/2007 | Schroath et al. |
| 7,345,794 B2 | 3/2008 | Matsui |
| 7,428,073 B2 | 9/2008 | Wakatabi et al. |
| 7,663,371 B2 | 2/2010 | Brune et al. |
| 7,670,727 B2 | 3/2010 | Kuchibhotla et al. |
| 7,672,023 B2 | 3/2010 | Tse et al. |
| 7,724,404 B2 * | 5/2010 | Mercer ......................... 358/474 |
| 7,956,614 B2 | 6/2011 | Brune et al. |
| 7,973,982 B2 * | 7/2011 | Mercer ......................... 358/474 |
| 8,085,448 B2 | 12/2011 | Kato et al. |
| 8,154,811 B2 | 4/2012 | Barsotti et al. |
| 8,189,240 B2 * | 5/2012 | Mercer ......................... 358/474 |
| 8,269,996 B2 | 9/2012 | Yamamoto |
| 8,335,021 B2 | 12/2012 | Tanaka et al. |
| 8,442,302 B2 | 5/2013 | Sandstrom et al. |
| 8,477,389 B2 * | 7/2013 | Mercer ......................... 358/474 |
| 8,537,416 B2 | 9/2013 | Sandstrom et al. |
| 8,570,611 B2 | 10/2013 | Tanaka et al. |
| 8,842,345 B2 * | 9/2014 | Mercer ......................... 358/474 |
| 2004/0169894 A1 | 9/2004 | Schroath et al. |
| 2005/0002062 A1 | 1/2005 | Wakatabi et al. |
| 2006/0082839 A1 | 4/2006 | Durbin et al. |
| 2006/0227387 A1 | 10/2006 | Patterson |

* cited by examiner

ARRANGEMENT FOR READING FROM AND/OR WRITING TO FLEXIBLE SHEET MEDIA IN A CURVED CONFIGURATION AND METHOD

This is a continuation application of copending prior application Ser. No. 13/919,058 filed on Jun. 17, 2013; which is a continuation of application Ser. No. 13/467,839 filed on May 9, 2012 and issued as U.S. Pat. No. 8,477,389 on Jul. 2, 2013; which is a continuation of application Ser. No. 13/163,031 filed on Jun. 17, 2011 and issued as U.S. Pat. No. 8,189,240 on May 29, 2012; which is a continuation of application Ser. No. 12/758,993 filed on Apr. 13, 2010 and issued as U.S. Pat. No. 7,973,982 on Jul. 5, 2011; which is a continuation of application Ser. No. 11/688,164, filed on Mar. 19, 2007 and issued as U.S. Pat. No. 7,724,404 on May 25, 2010; which is a continuation of application Ser. No. 10/753,308, filed on Jan. 8, 2004 and issued as U.S. Pat. No. 7,212,319 on May 1, 2007; which is a continuation of application Ser. No. 10/017,771, filed on Dec. 12, 2001 and issued as U.S. Pat. No. 6,697,174 on Feb. 24, 2004; which is a continuation of application Ser. No. 09/165,668, filed on Oct. 3, 1998 and issued as U.S. Pat. No. 6,344,904 on Feb. 5, 2002, the disclosures of which are incorporated herein by reference.

The present invention relates generally to arrangements for transferring information to and/or from flexible sheet media and more particularly to an arrangement in which the flexible media is supported in a curved configuration across its width and is written to and/or read from in such curved configuration. An associated method is also disclosed. The invention is applicable for use in portable and high speed applications.

The ever decreasing size of personal, portable computers, coupled with a continuous reduction of the size of these devices has resulted in a dramatic rise in their popularity. In fact, portable computers are now so small as to be referred to appropriately by the term "notebook" computer. Unfortunately, however, there has not been a concurrent reduction in the physical size of certain peripheral devices compatible with state-of-the-art notebook computers. One specific example of a peripheral device that has not kept in step with reduction in portable computer size is that of the portable printer, as will be described.

Conventional thinking with regard to printing and/or scanning devices is based on the constraint that the paper is supported flat across its width at the point or line on the paper where printing is being performed. Thus, the paper is typically curved around a platen or through a roller assembly which provides the desired flat configuration across the width of the paper at least at the point of printing or scanning. Therefore, prior art printing devices have necessarily been produced under the constraint that at least one dimension of the device is larger than the width across which printing is performed. Moreover, printing in a flat configuration necessitates that the direction of travel of the print head must be bi-directional i.e., the head must return to the starting edge to print the next line, or at best print the next line during the return trip. Additionally, the acceleration and deceleration forces of bi-directional printing create additional wear on the printer components and significantly reduce the efficiency of the device.

It should be mentioned that other prior art devices have also been subject to the previously described dimensional constraint. These devices include, but are not limited to fax machines and scanners.

The present invention removes the foregoing dimensional constraint in a highly advantageous and heretofore unseen way which is particularly useful in portable and high speed applications.

SUMMARY OF THE INVENTION

As will be described in more detail hereinafter, there is disclosed herein an assembly for transferring information to and/or from flexible sheet media in a highly advantageous curved configuration. The sheet material includes a length and a width defining first and second opposing surfaces. The assembly includes support means for supporting the sheet the curved configuration across its width, having the first surface inwardly oriented with respect to the curved configuration. Thereafter, moving means moves the flexible sheet material so supported in a direction along a read/write path generally parallel to the sheet material length and transverse to the direction of curvature. A read/write arrangement is provided which is configured for reading and/or writing information across the width of the first surface of the sheet as the sheet is moved along the path in the curved configuration.

In one feature, means is provided for rotationally moving the read/write arrangement in a predetermined way in the housing such that the read/write arrangement is in a confronting relationship with the first, inwardly oriented surface and cooperates with the movement provided by the sheet material moving means so as to cause the read/write arrangement to sequentially read information from and/or write information to the inwardly oriented, first surface of the sheet as the read/write arrangement traverses the width of the flexible sheet material while the latter is on the read/write path in the curved configuration.

In another feature, a read and/or write operation may be performed on the second, outwardly oriented surface of the sheet material such that reading and/or writing may be performed on the second surface independent of a read and/or write operation being performed on the first surface. In this way, read/write operations may be performed simultaneously on the first and second surfaces.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 1:
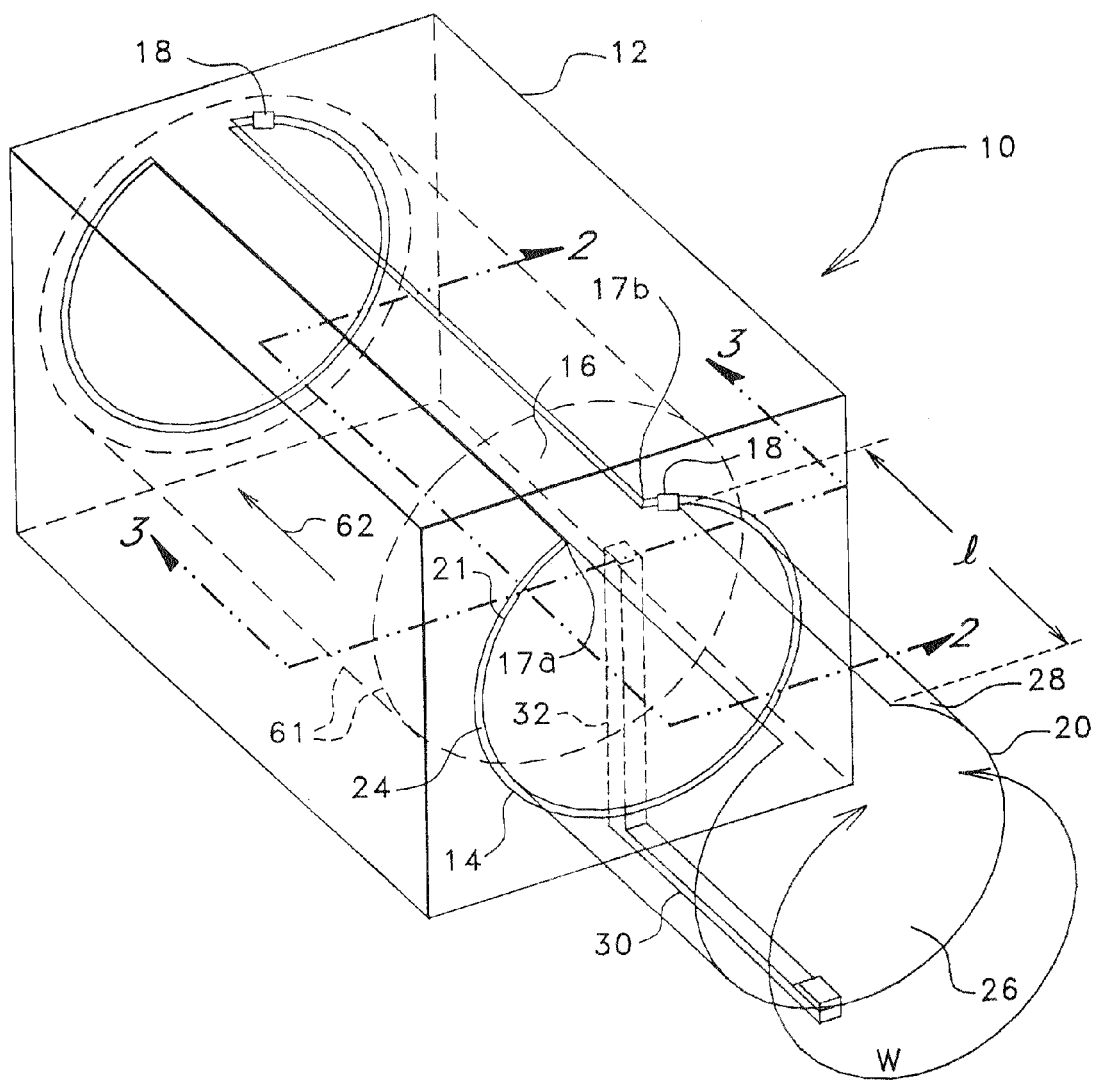
FIG. 1 is a diagrammatic view in perspective of an assembly for reading from or writing to flexible sheet material manufactured in accordance with the present invention.

Attention is immediately directed to FIG. 1 which illustrates a first embodiment of a system manufactured in accordance with the present invention and generally indicated by reference numeral 10 for transferring information to and/or from flexible sheet material while the latter is in a highly advantageous and heretofore unseen curved configuration. Acceptable sheet material for use with the present invention includes, but is not limited to paper, card stock, envelopes, thermal paper and transparent acetate or any sheet material capable of being formed into the curved configuration to be described. It should be noted that the dimensions in the figures have been exaggerated with respect to component size and relative spacing for illustrative purposes.

Still referring to FIG. 1, first embodiment 10 of the system includes a housing 12 which defines a generally circular feed slot 14. It is noted that the outline of housing 12 may include any suitable configuration including, for example, curved surfaces. A gap 16 is present between the confronting ends 17a and 17b of feed slot 14. End 17b of slot 14 contains a width adjustment guide 18 for adjusting the circumferential length of slot 14. FIG. 1 illustrates a leading edge 21 of sheet 20 being inserted into slot 14. Sheet 20 has a length, l, and a width, w, defining a first surface 26 and a second surface 28. The thickness of sheet 20 is relevant only to the extent that the sheet can be formed into the desired curved configuration. In accordance with the present invention, sheet 20 is curved into a generally circular form across width w such that the sheet is in the form of a tube or cylinder which causes first surface 26 to be interior relative to second surface 28. With regard to the length, l, and width, w, of flexible sheet material 20, it is to be understood that these dimensions could be readily interchanged by one of ordinary skill in the art in view of this overall disclosure. However, by configuring the assembly such that slot 14 accepts a narrower dimension of the sheet material, the overall size of the assembly is reduced. FIG. 1 further illustrates a support arm 30 which is movable between an operating position and a storage position (not shown). In the operating position the support arm supports sheet 20 while in the storage position, the support arm 30 is housed in a support arm slot 32 shown by dashed lines.

Figure 2:
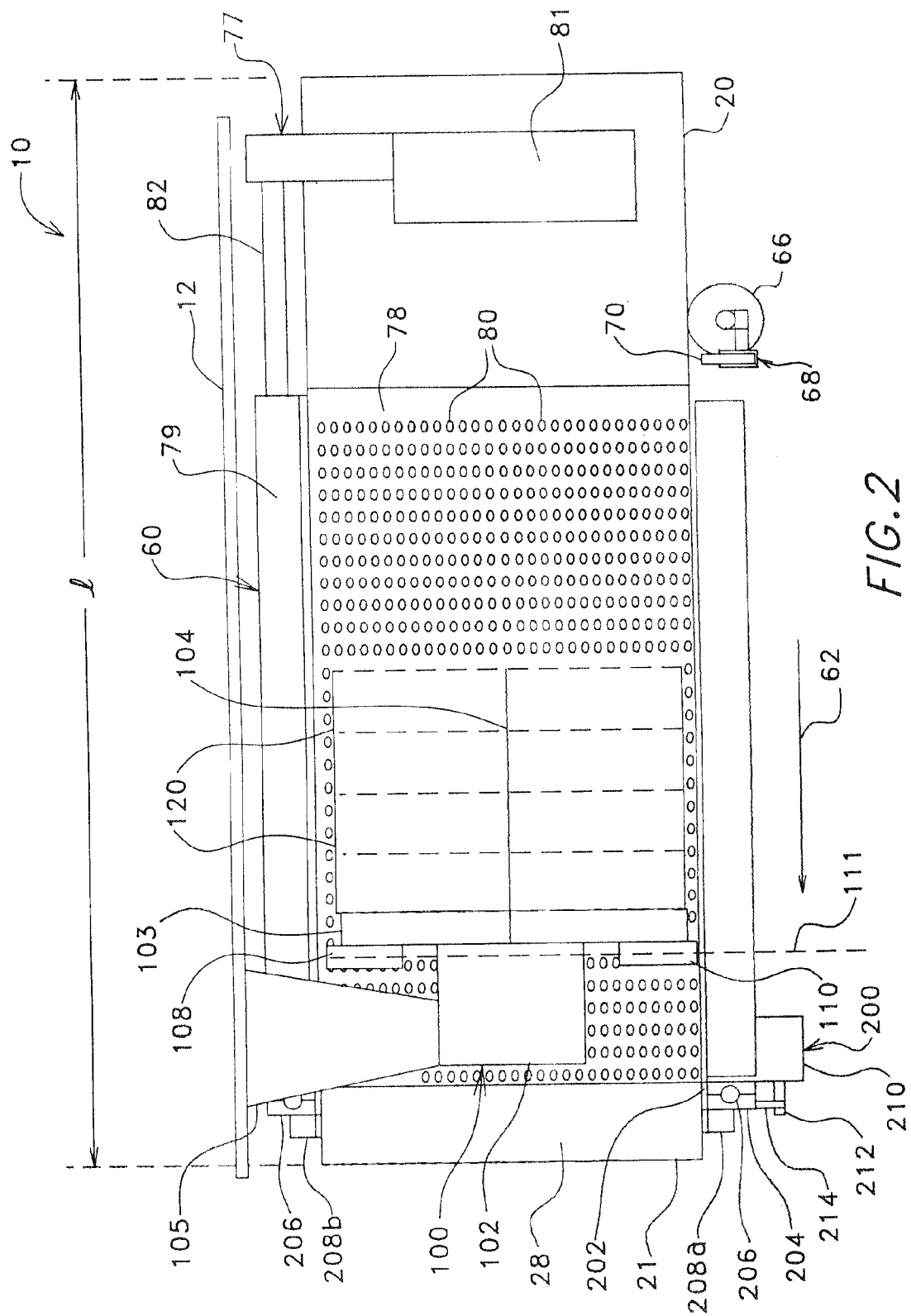
FIG. 2 is a diagrammatic cross-sectional view, looking in a direction transverse to the read/write path followed by the sheet material, showing details of a sheet feed arrangement which forms part of the assembly of FIG. 1.

Attention is now directed primarily to FIG. 2 illustrating a sheet feed system generally indicated by reference number 60. With regard to FIG. 1, it is noted the feed system is located within a region defined by dashed lines 61 having a cylindrical form. It should also be noted that like components are indicated using like reference numbers wherever possible throughout the various figures. FIG. 2 shows sheet 20 after having moved through the system such that leading edge 21 has passed completely therethrough. In accordance with the present invention, sheet feed system 60 supports sheet 20 in the highly advantageous curved configuration of the present invention while moving sheet 20 in a predetermined way along a path 62 parallel to its length, l, and transverse to its width, w (FIG. 1).

Figure 3:
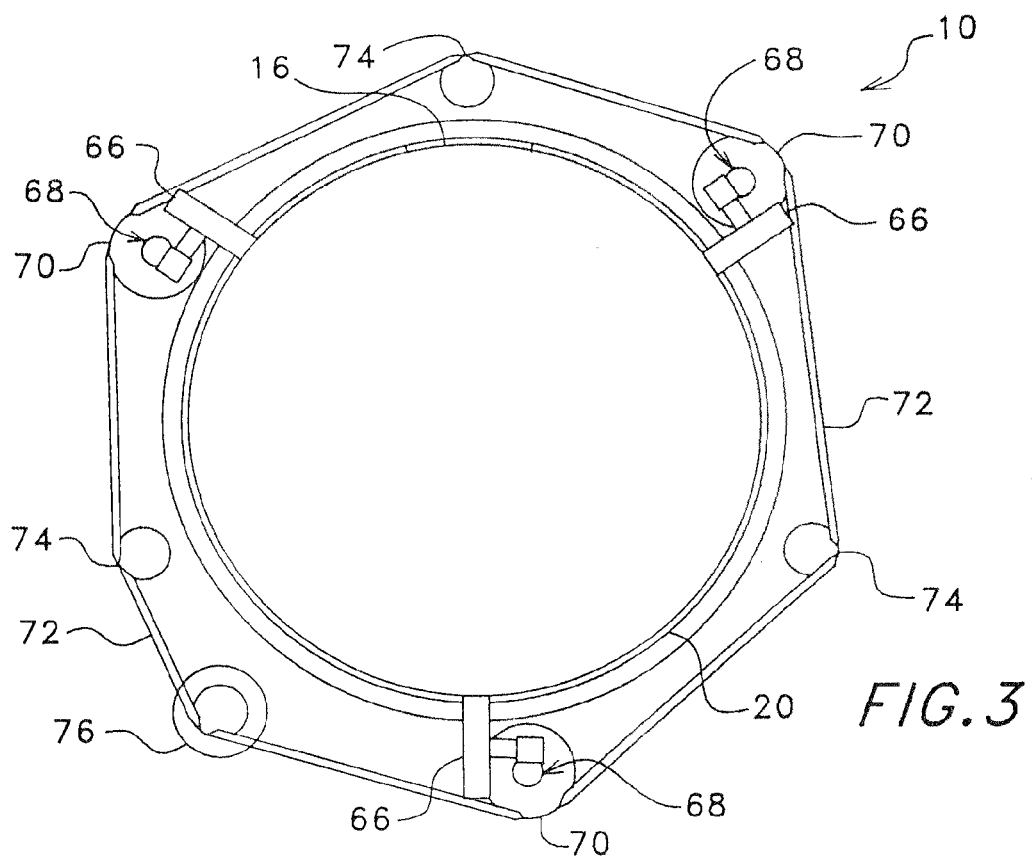
FIG. 3 is a diagrammatic cross-sectional view illustrating further details of the sheet feed arrangement shown in FIG. 2, looking in a direction parallel to the read/write path followed by the sheet material.

Referring to FIGS. 1 and 3, during operation of first embodiment 10, sheet 20 is inserted (FIG. 1) into slot 14 in the curved configuration. Upon insertion, sheet 20 is engaged by a plurality of feed rollers 66. Feed rollers 66 move sheet 20 through housing 12 during a reading and/or writing operation. Rotation of feed rollers 66 is accomplished using a plurality of worm gear drive arrangements 68 that are, in turn, rotated by corresponding pulleys 70 (FIG. 3). Pulleys 70 are driven by a drive belt 72 supported thereby in cooperation with a number of capstan rollers 74. Power is supplied to drive belt 72 by a drive motor 76. The latter may be any suitable type of motor, including but not limited to stepper or servo type motors. During operation of the assembly, the drive motor causes sheet 20 to advance along path 62 in the indicated direction. While sheet 20 is moved through housing 12 by sheet feed system 60, sheet 20 is supported in the curved read/write configuration of the present invention, as will be described.

Referring now to FIGS. 1 and 2, a vacuum arrangement 77 is located within cylinder 61 in FIG. 1 for supporting sheet 20 during a read or write operation. In FIG. 2, the vacuum arrangement includes a vacuum platen 78 defined as an inner surface of an evacuable chamber 79. Vacuum platen 78 is cylindrical whereby to define the curved configuration of the present invention and includes a plurality of throughholes 80 in its inner surface. A vacuum fan 81 is arranged for drawing air through a vacuum duct 82 which is in communication with evacuable chamber 79, thus causing air to be drawn into throughholes 80. In this manner, sheet 20 is biased against vacuum platen 78. Fan 81 may be located within the curved configuration of the sheet material, as shown, or, alternatively, at some position outside the curved configuration or even outside of housing 12 wherein duct 82 may be routed (not shown) through gap 16. The vacuum arrangement is configured for biasing the sheet material against vacuum platen 78 while still permitting advancement by rollers 66 during a read and/or write operation. It should be appreciated that the illustrated feed mechanism is exemplary of only one of many possible mechanisms, all of which are considered to be within the scope of the present invention. For example, sheet 20 could be supported by a spider roller arrangement (not shown) instead of the illustrated vacuum system.

Referring to FIG. 2, a read/write arrangement is generally indicated by reference number 100. It is noted that in FIG. 1, read/write arrangement 100 is located within cylinder 61. Read/write arrangement 100 is configured for reading information from or writing information to sheet 20 during a read and/or write operation using a head motor 102 which rotates a platter 103 about an axis 104. Head motor 102 is mounted to housing 12 using a motor bracket 105 which passes through gap 16 (FIG. 1). In this regard, it should be appreciated that any components requiring positioning within the curved configuration formed by sheet 20 may utilize mounts which pass through gap 16. A print head 108 and an opposing read head 110 are affixed to platter 103 such that they confront sheet 20 during a read and/or write operation and are rotated in a read/write plane 111 (shown as a dashed line) at a substantially constant distance from the innermost surface of the sheet material. Counter weights (not shown) or any other suitable balancing arrangement may be used as required to ensure rotational stability during read and/or write operations.

Read/write arrangement 100 cooperates with sheet feed system 60 to read information from and/or write information to sheet 20 in read/write plane 111. In accomplishing this, sheet 20 may be divided into lines or sections (not shown) across width w (FIG. 1). As sheet feed system 60 advances sheet 20, a particular line of sheet 20 is aligned at any one time with read/write plane 111 in which print head 108 and read head 110 rotate. As read/write arrangement 100 rotates these heads in a confronting relationship with this particular line, information may be written to or read from the line using one of the heads. Feed system 60 then advances sheet 20 such that the next line of sheet 20 is aligned with the read/write plane. Ideally, sheet 20 is advanced to the next line as the print head and/or read head traverses gap 16. In this way, read/write arrangement 60 may rotate constantly and in a single direction. It should be appreciated that the rotational speed and gap width govern the gap transition time during which sheet 20 is advanced. This results in at least one significant advantage in reading information from and/or writing information to flexible sheet material in accordance with the present invention. Specifically, because the system may read or write in a single direction and at constant speed, the system is not encumbered by the need for accelerating and decelerating the print and/or read heads each time the heads read and/or write a different line on the sheet, as is seen, for example, in conventional ink jet printers. This feature is highly advantageous in allowing printing to take place at high speed and with less wear on the moving parts of the system. With constant rotational speed there is no requirement for rotational position determination. An index mark corresponding to the edge of the paper can be used as an initial reference and timing relative to a rotating head passing the reference mark can be used to establish a position later in rotation. The initial index reference may comprise, for example, the edge of the page as identified using a read head.

Still referring to FIG. 2, in a helical scanning embodiment of the present invention, read/write arrangement 100 may be positioned in housing 12 such that read/write plane 111, in which print and/or read heads rotate, is slightly skewed (not shown), for example, at an angle of approximately 1° with respect to a line perpendicular to path 62 followed by sheet 20. The skewed relationship allows sheet feed system 60 to move sheet 20 through housing 12 continuously at a constant rate even while reading or writing is taking place. In this instance, as print head 108 or read head 110 completes a read or write operation along one line, the next line is positioned such that reading or writing may continue along this next line after the head traverses gap 16. Essentially, the read or write head traces a continuous spiral down sheet 20 as sheet feed system 60 moves the sheet through the housing. Moreover, the skew angle may be based on the width of the line to be read or written. For example, if read head 110 or print head 108 have a height typically comprising more than one character or line the angle of skew may be increased. Conversely, if a single row of pixels is to be read or written across the width of the page, the skew angle may be reduced below 1°.

One of ordinary skill in the art will appreciate that read/write arrangement 100 may be modified in an essentially unlimited number of ways (not shown). For example, a plurality of platters may be provided wherein one platter performs writing and another platter performs reading in separate write and read planes. As will be further described, a specially configured platter may not require rotation. In such an instance, the curved configuration of the present invention need not be circular as illustrated. For example, an elliptical shape could be used. Moreover, platters, cartridges, other head support arrangements, and heads themselves may be configured for replacement and/or interchange.

Figure 4:
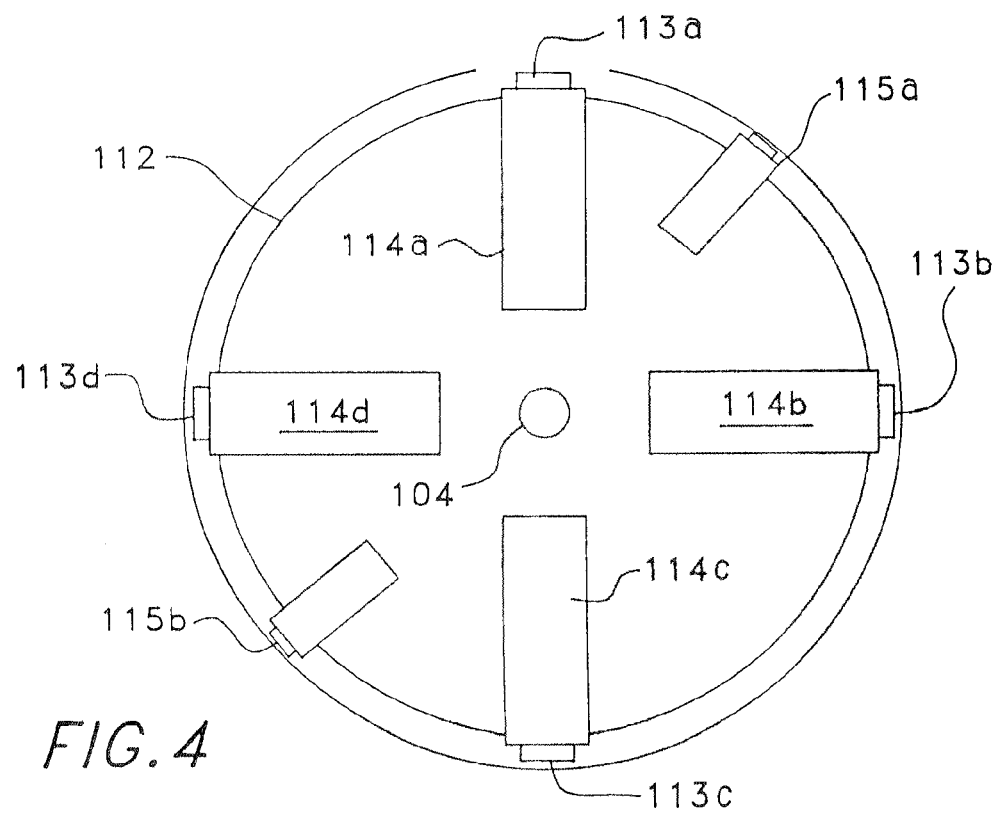
FIG. 4 is a diagrammatic elevational view showing a modified version of a platter supporting an arrangement of read and write heads for use in the overall assembly of the present invention.

Turning now to FIG. 4 wherein another modification of read/write arrangement is illustrated. In this modification, a platter 112 is illustrated for use in the read/write arrangement which includes four write heads indicated as 113a-d. The write heads may be integrally formed as part of ink cartridges 114a-d. In addition, a pair of read heads is provided as indicated by reference numbers 115a and 115b. It is noted that the configuration of platter 112 may be changed in any suitable manner. For example, one of the read heads may be eliminated. As another example, one or more of ink cartridges 114 may be eliminated. In this regard, the provision of multiple cartridges is useful in performing color printing. Separate cartridges may contain, for example, cyan, magenta, yellow and black ink.

Referring to FIGS. 2 and 4, in one feature, ink may be provided to print heads in various ways. For example, platter 103 of FIG. 2 may support four print heads orthogonally arranged in the manner of FIG. 4. Ink may be supplied to the print heads from a plurality of four stacked reservoir disks 120 (indicated as dashed lines in FIG. 2) with a separate disk for each color of ink used during a writing process. Moreover, the disks may be supported, for example, on an opposite side of platter 103 with respect to the print heads. Of course, the number of stacked disks may vary in accordance with the number of colors required for printing. The disks are centered for rotation about axis 104. By varying the disk thickness, the stacked disks may be configured to hold predetermined amounts of particular ink colors based on anticipated usage of that particular color. Stacked disks 120 may alternatively define a number of different ink chamber shapes, including ring-like structures or triodes to be described immediately hereinafter. Ink supply tubes (not shown) may advantageously utilize centripetal force to feed ink to the write head based on appropriate routing on and through platter 103. While the write heads associated with each ink chamber may be located in read/write plane 111, each chamber may be configured as an ink cartridge with an integral write head (not shown) such that different ink colors are written to sheet 20 in different planes.

Figure 5:
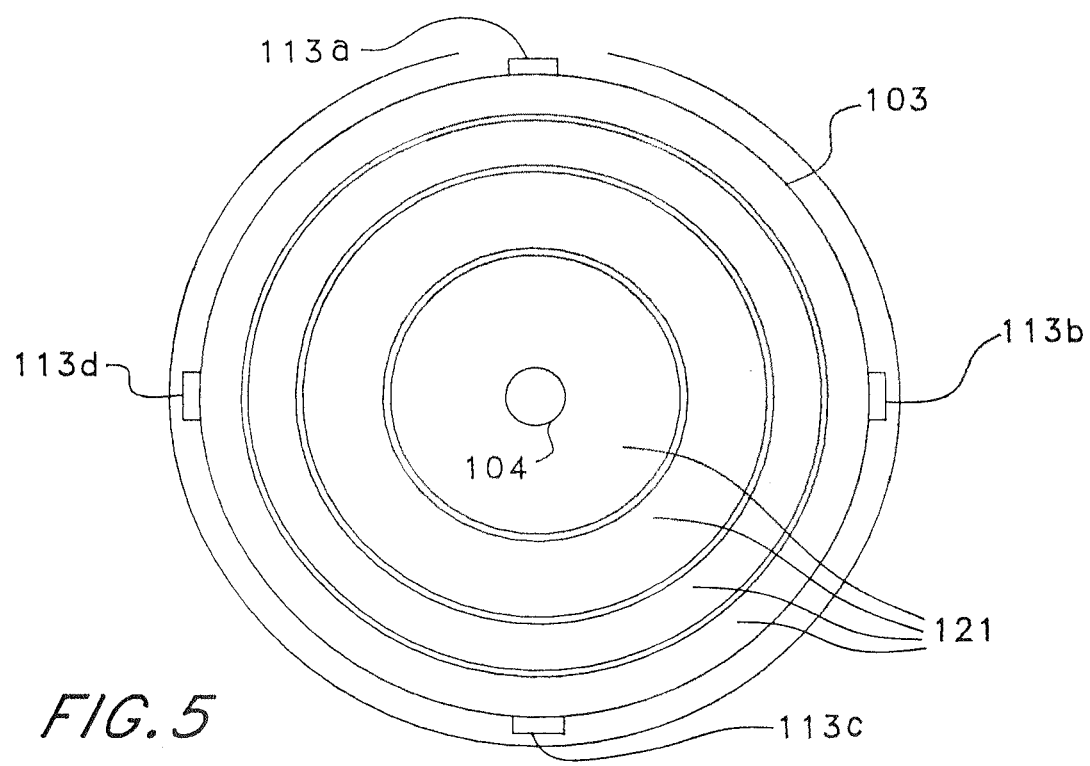
FIG. 5 is a diagrammatic elevational view showing another modified version of a platter supporting an arrangement of write heads for use in the overall assembly of the present invention.

FIG. 5 illustrates another multi-color ink chamber arrangement wherein a plurality of ink chambers 121 are arranged as concentric disks or toroids attached, for example, to platter 103 arranged for feeding ink to write heads 113a-d. The write heads may be positioned on the opposite side of the platter from ink chambers 121 with appropriate provisions for providing ink to the heads, as discussed above. This arrangement may be advantageous since colors which require less ink usage during average printing operations may be placed in smaller, inner chambers.

Figure 6:
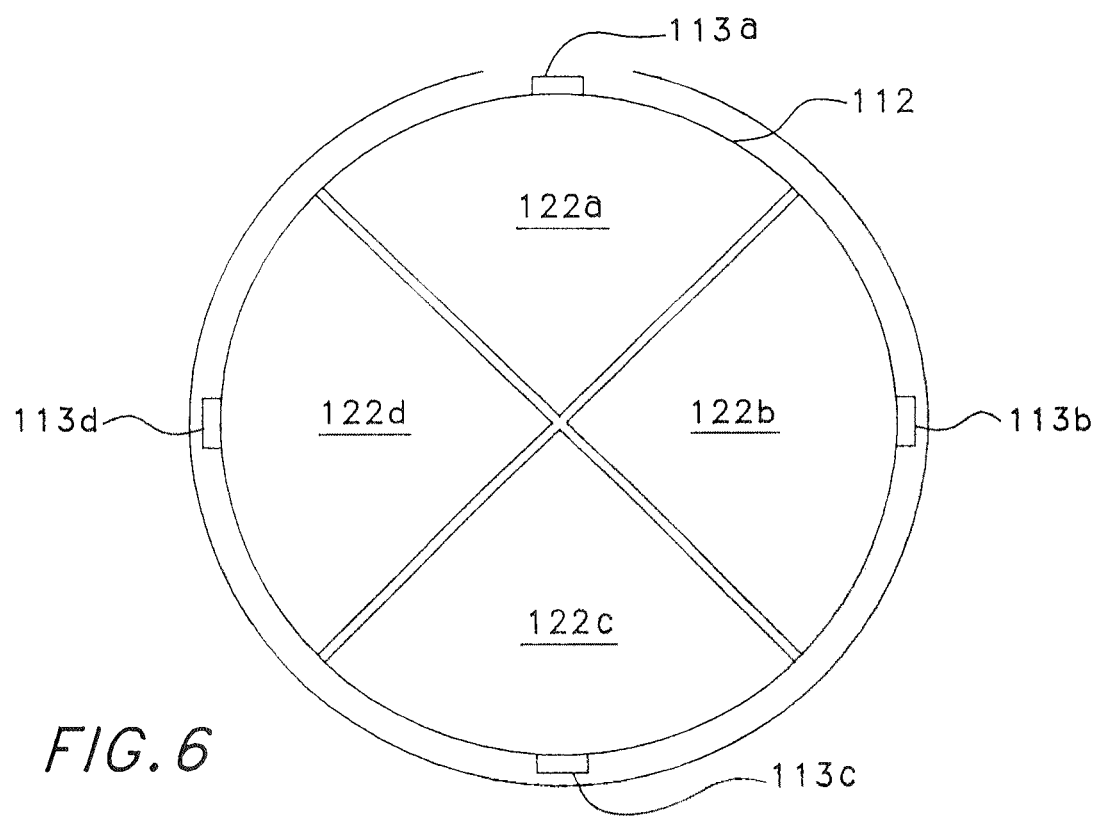
FIG. 6 is a diagrammatic elevational view showing still another modified version of a platter supporting an arrangement of write heads for use in the overall assembly of the present invention.

Referring to FIG. 6, still another multi-color ink chamber arrangement is illustrated wherein a plurality of ink chambers 122 are arranged as wedge or pie shaped chambers surrounding axis 104 of rotation of platter 103 such that chambers 122 are essentially coplanar with respect to axis 104.

Referring again to FIGS. 1 and 2, in another feature, ink may be supplied from one or more reservoirs (not shown) located external to the curved configuration of sheet 20. Accordingly, ink may be supplied advantageously along axis 104 by forming one or more ink passages (not shown) positioned along the axis and in communication, for example, with print head 108 via a swivel fitting at the center of rotation of the platter. This feature is advantageous in contemplated high speed printing applications wherein many sheets may be printed without the frequent need to replace ink cartridges, as the reservoirs may be sufficiently large to accommodate the volume of printing desired. This feature has the further advantage that ink may readily be added to reservoirs, rather than being supplied in cartridges, thus making the process more economical.

As mentioned above, a read and/or write arrangement is contemplated which does not rotate. Specifically a read or write mechanism may be provided (not shown) having a peripheral read and/or write head confronting sheet 20 such that the read/write arrangement is capable of reading or writing at once across the entire width of sheet 20. This arrangement is particularly advantageous for use in facsimile applications, for example, utilizing thermal paper for the printing aspect of the operation, and for scanning operations, although the embodiment is certainly not limited to these applications.

Figure 7:
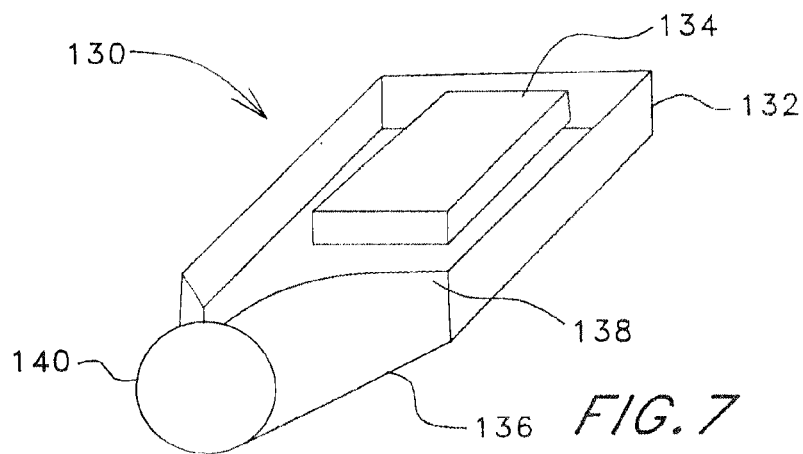
FIG. 7 is a diagrammatic view, in perspective, showing a sheet feed mechanism for selecting individual pieces of sheet material, curving the sheets into the curved configuration of the present invention and, thereafter, directing the curved sheet into the overall assembly.

Referring now to FIG. 7, a first sheet feed mechanism is diagrammatically illustrated as indicated by the reference number 130. Sheet feed system 130 includes, for example, a paper tray 132 which provides individual sheets 20 from an overall stack 134 to a forming arrangement 136. During operation, the sheet feed system sequentially selects one sheet 20 from stack 134 and, thereafter, feeds the sheet to forming arrangement 136. Forming arrangement 136 accepts the sheet in flat form at an input end 138 and outputs the sheet at an output end 140 in the curved configuration of the present invention to slot 14 (FIG. 1). Any suitable mechanism may be employed in sheet feed system 130, as may be configured by one of ordinary skill in the art so long as the described functions are implemented. For example, a vacuum platen arrangement (not shown) could be utilized in the forming arrangement in view of previous teachings. Moreover, sheet 20 may be provided in roll form, in which case width w remains constant while length l may vary from sheet to sheet. This is particularly advantageous in the instance of thermal-type paper which is commonly provided in roll form and cut to length following a write operation.

Figure 8:
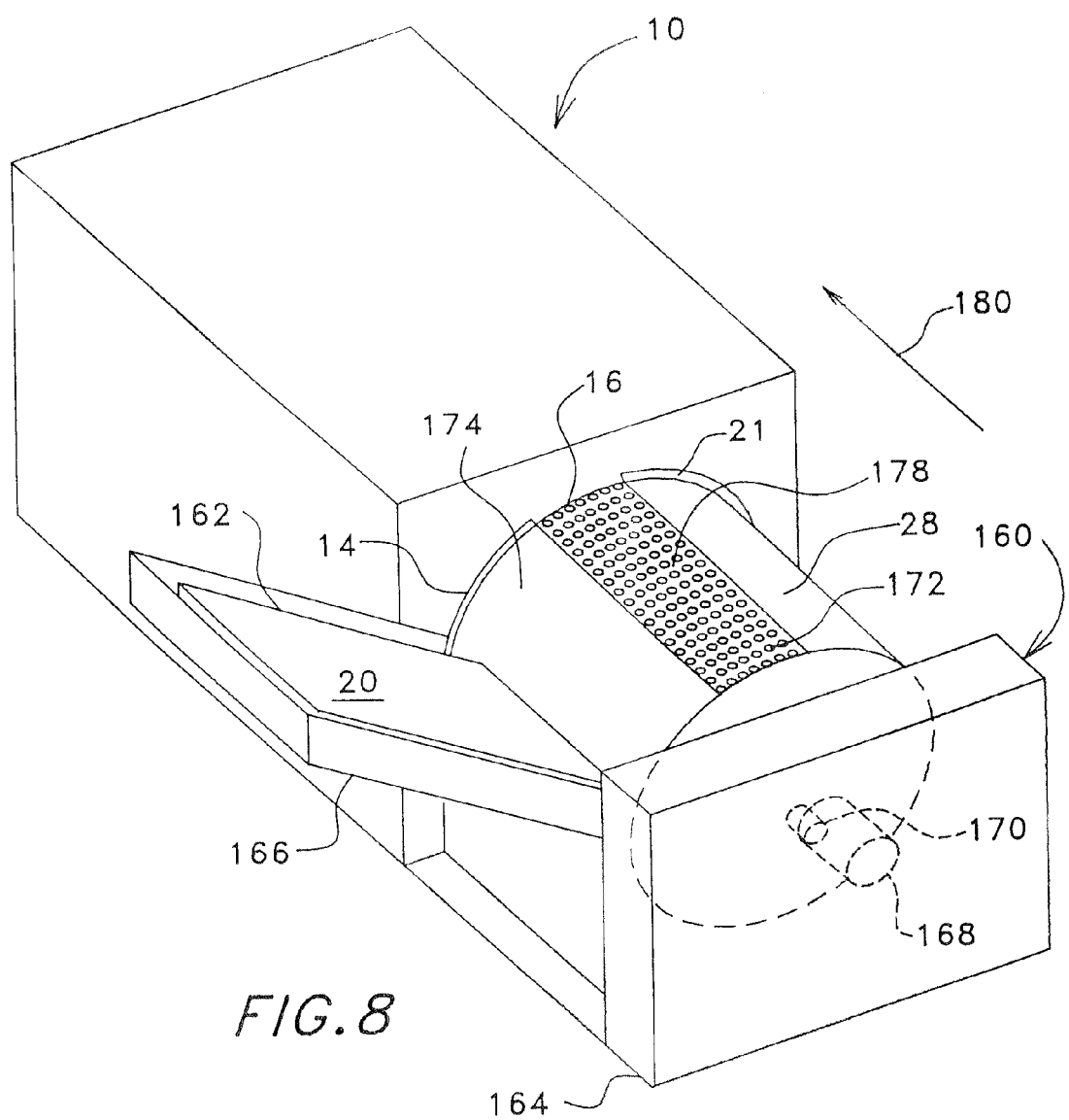
FIG. 8 is a diagrammatic view, in perspective, showing another sheet feed mechanism for selecting individual pieces of sheet material, curving the sheets into the curved configuration of the present invention using a rotating drum arrangement and, thereafter, directing the curved sheet into the overall assembly.

Turning to FIG. 8, a second sheet feed mechanism is diagrammatically illustrated as indicated by the reference number 160 configured for feeding a stack 162 of flexible sheet material 20 into overall system 10. Sheet feed mechanism 160 includes a housing 164 which interfaces with a tray 166 that, in turn, holds stack 162 of flexible sheet material. Housing 164 supports a drum motor 168 having a rotating output shaft 170 that, in turn, rotates a cylindrical feed drum 172. The latter defines an evacuable cavity 174 which is interfaced with a vacuum arrangement (not shown) which produces a vacuum within the cavity. An outer surface of the feed drum defines a plurality of throughholes 178 through which air is drawn by the vacuum arrangement. During operation, one sheet of flexible material is selected from stack 162 and fed to drum 172. Through its rotation, drum 172 picks up the selected sheet and forms it into the curved configuration of the present invention as a result of the sheet being drawn against the feed drum by means of the vacuum arrangement. Thereafter, the selected sheet is translated in a direction indicated by an arrow 180 by a sheet advance mechanism (not shown) that may be arranged, for example, about the periphery of drum 172 such that leading edge 21 of the sheet enters slot 14 for printing and/or scanning operations, as described above.

It should be appreciated that reading and writing operations may take place on an individual sheet of flexible material simultaneously in the instance where separate read and write heads are provided having a fixed i.e., indexed relationship between the read and write heads. This feature is particularly useful in the application of filling in blanks on preprinted forms in an interactive manner, for example, interfaced with a personal computer.

Referring again to FIG. 2, an arrangement 200 may be provided for reading from or writing to second, outer surface 28 of sheet material 20. In this regard, it should be appreciated that reading from or writing to outer surface 28 is facilitated by the curved configuration of the present invention since normal thicknesses of sheet material 20 are relatively rigid when supported in the curved configuration. Arrangement 200 includes a bearing assembly having a first, circular bearing race 202 supported in a suitable manner adjacent one end of system 10. In this instance, arrangement 200 is in proximity to the output end of system 10. A second bearing race 204 is rotatably engaged against the first race by a plurality of bearings 206. Second bearing race 204 supports a pair of read and/or write heads 208a and 208b. A motor 210 includes an output shaft 212 which engages a belt 214 (only partially shown) so as to selectively rotate second bearing race 204 and its associated read/write heads. Arrangement 200 may be modified in any suitable manner so long as selective rotation of the read/write heads is provided relative to second surface 28 of sheet material 20. For example, the number and position of the heads may be altered or other forms of rotational configurations may be implemented. Arrangement 200 may include print heads forming part of an overall cartridge (not shown) which contain ink in a manner similar to that previously described. In this regard, it should be appreciated that the ink cartridges must be configured in a way which overcomes the centripetal force on the ink as a result of rotation. For example, the cartridge could include a pump or inflatable bladder (neither of which are shown) which pressurizes the ink to force the ink to the print head(s). Power and control signals for the read/write heads may be provided, for example, through a slip ring arrangement (not shown).

Figure 9:
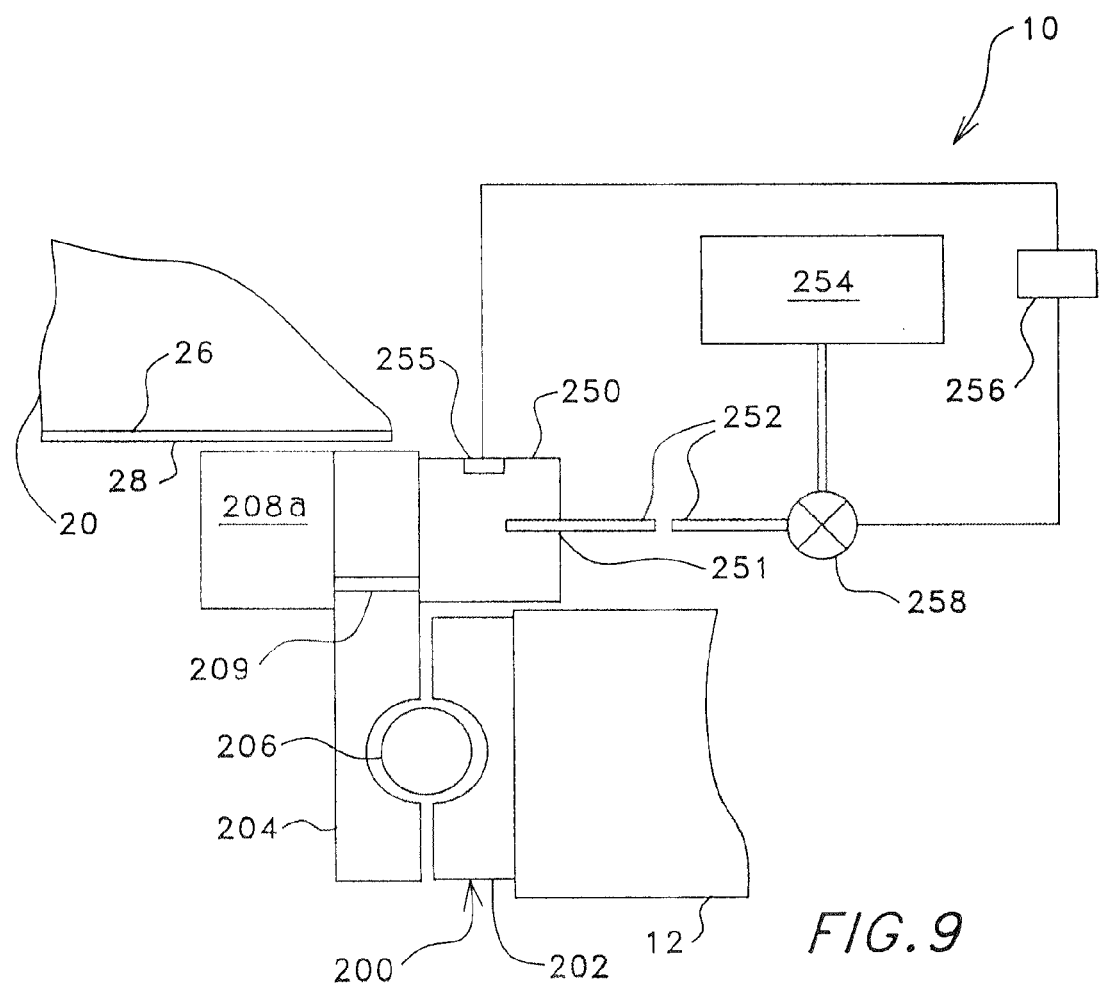
FIG. 9 is an enlarged diagrammatic view, in cross-section, illustrating an external ink supply arrangement for use in printing on the outermost surface of sheet material in the curved configuration of the present invention.

Alternatively, ink may be supplied to print heads by the arrangement shown in FIG. 9. FIG. 9 diagrammatically illustrates an external ink supply feature which may form part of arrangement 200 wherein an external ink supply is provided for feeding ink to one or more write heads arranged about the periphery of bearing race 204. In accordance with this feature, a rotating ink reservoir 250 is supported by bearing race 204 so as to rotate along with read/write heads 208a and 208b within printing range of outer surface 28 of sheet material 20. An ink supply tube 209 routes ink from the outer periphery of rotating ink reservoir 250 to heads 208 by the centripetal force on the ink resulting from rotation. Rotating ink reservoir 250 includes an annular slot 251 (which appears here as a gap in the periphery of the ink reservoir). A fill tube 252 projects through slot 251. Fill tube 252 is stationary with respect to the rotating ink reservoir and is communication with the interior of a stationary ink reservoir 254. A sensing element 255 detects the ink level within rotating ink reservoir 250 so as to avoid overfilling the rotating reservoir causing ink to escape from slot 251. When arrangement 200 is not rotating, the sensing element may be positioned at a lowermost position of the circular path followed during rotation such that the sensor may detect the ink level in the rotating reservoir in a way which avoids ink escaping from annular slot 251. Moreover, a parting seal arrangement (not shown) may be provided to seal slot 251 such that ink is not only prevented from escaping, but the ink present in the rotating reservoir is not subject to drying out when the printer is idle.

When arrangement 200 is rotating, sensing element 253 detects when the reservoir 250 is full. For a rotating condition, centripetal forces hold the ink to the outer circumference of the reservoir 250 to facilitate measurement of the ink level during rotation as well as forcing the ink to flow to heads 208.

It should be appreciated that the fill requirements for rotating and stationary conditions can be different and more than one sensor may be used. Other components of the system include controller 256 and valve 258. In some applications a pump (not shown) may be required to facilitate ink flow. Reservoir 250 may also include baffles or an absorbent material (neither of which is shown) such as, for example, a sponge to prevent sloshing of the ink during transition from stationary to rotating and vice versa. For multiple color printing, reservoir 250 could be divided into arc segments. Multiple ink supply tubes may be employed using a timed relationship to inject the ink into the various segments of the reservoir when the appropriate segment is in alignment with its respective supply tube. In another alternative, concentric reservoirs (not shown) similar to reservoir 250 may be provided with each reservoir supplying a different color, each concentric reservoir having a different radius or being located at a different position long the axis of rotation.

By using arrangement 200, both sides of sheet material 20 may be read from or written to. It should also be appreciated that system 10 may be utilized, for example, in a two-sided digital copier arrangement wherein one implementation scans both sides of sheets to be copied while another implementation prints onto both sides of blank sheets.

Based on this disclosure, it is considered that the present invention is adaptable for use with virtually any type of printing mechanism including, but not limited to ink jet printing, bubble jet printing or even laser printing applications.

It should be noted that the present invention is not limited to the embodiments and methods described herein. Any arrangement or method useful in reading information from or writing information to flexible sheet material while the latter is curved across its width is considered to be within the scope of the present invention. For example, recalling the configuration of FIG. 1 and in one modification related to high-speed printing, the motor which rotates print or read heads may physically be mounted at a lateral distance from the read/write planes by mounting the read/write heads on a mandrel which extends into the curved configuration of the sheet material during a read or write operation. In this manner, gap 16 may be eliminated such that the lengthwise edges of the sheet material directly confront one another, eliminating time required for the heads to translate the gap. Following reading or writing, the lengthwise edges may separate so as to pass by the motor mount or any other required mount. Moreover, it should be further noted that any rotating read/write arrangement and associated method is considered to be within the scope of the present invention. Therefore, the present examples are to be considered as illustrative and not restrictive, and the invention is not to be limited to the details given herein, but may be modified within the scope of the appended claims.

What is claimed is:

1. An apparatus for reading information from and/or writing information to at least one sheet of flexible sheet material, said sheet having a length and a width defining first and second opposing surfaces and opposing lengthwise and widthwise edges, said apparatus comprising:

a platen for supporting said sheet in a curved configuration across said width such that said first surface is inwardly oriented with respect to said curved configuration to define a tubular shape having said lengthwise edges positioned in a confronting relationship;

a sheet feeder for moving said flexible sheet material in a direction along a lengthwise path oriented at least generally along said length and transverse to the direction of curvature, but without rotation of the flexible sheet material about the lengthwise path; and at least one of a read head and a write head for at least one of reading and writing information widthwise across said first surface of said flexible sheet material based on movement along said path.

2. The apparatus of claim 1 wherein a gap is formed between the lengthwise edges in said confronting relationship.

3. The apparatus of claim 1 wherein the lengthwise edges directly confront one another in said confronting relationship without forming a gap therebetween.

4. The apparatus according to claim 1 wherein a second surface of said sheet is outwardly oriented and wherein said second surface is received against said platen.

5. The apparatus of claim 4 wherein said platen is at least generally cylindrical.

6. The apparatus of claim 4 wherein said platen is configured for applying a vacuum force to draw the second surface against the platen.

7. The apparatus of claim 6 wherein said platen defines a plurality of throughholes for applying said vacuum force.

8. The apparatus of claim 6 wherein said actuator is configured for engaging the sheet using a plurality of rollers for moving the sheet along said lengthwise path irrespective of said vacuum force.

9. The apparatus of claim 4 wherein said platen defines said tubular shape and including a vacuum fan that is located within the curved configuration of the sheet and in vacuum communication with said platen for applying a vacuum force to draw the second surface against the platen.

10. The apparatus of claim 9 wherein said platen defines a cylindrical shape as the tubular shape.

11. The apparatus of claim 9 wherein a duct provides vacuum communication between said platen and said vacuum fan.

12. The apparatus of claim 11 wherein said sheet includes a pair of lengthwise edges and said curved configuration places the lengthwise edges in a confronting relationship with a gap therebetween and said duct is located at least partially in said gap.

13. The apparatus of claim 1 including a housing defining an evacuable chamber having an inner surface that defines said platen.

14. The apparatus of claim 13 including a fan in communication with said evacuable chamber to produce a vacuum force that is applied by said platen to said sheet.

15. The apparatus of claim 1 wherein said write head is configured to write by emitting ink.

\* \* \* \* \*